United States Patent [19]
Inagaki et al.

[11] Patent Number: 5,589,121
[45] Date of Patent: Dec. 31, 1996

[54] METHOD OF ENLARGING DESIGN PROVIDED ON A SYNTHETIC RESIN FILM

[75] Inventors: Jiro Inagaki; Takashi Shinoki; Atsushi Hari, all of Kanagawa-ken, Japan

[73] Assignee: Teikoku Tsushin Kogyo Co., Ltd., Kanagawa-ken, Japan

[21] Appl. No.: 355,540

[22] Filed: Dec. 14, 1994

[30] Foreign Application Priority Data

Jul. 12, 1994 [JP] Japan .................................. 6-183841

[51] Int. Cl.$^6$ .................................................. B29C 45/16
[52] U.S. Cl. ........................... 264/132; 264/135; 264/266
[58] Field of Search ................................ 264/132, 135, 264/266

[56] References Cited

U.S. PATENT DOCUMENTS

| | | | |
|---|---|---|---|
| 4,205,036 | 5/1980 | Trame | 264/132 |
| 4,369,157 | 1/1983 | Conner | 264/266 |
| 4,414,731 | 11/1983 | Riemer | 264/135 |
| 5,152,861 | 10/1992 | Hann | 264/132 |

FOREIGN PATENT DOCUMENTS

| | | | |
|---|---|---|---|
| 60-34834 | 2/1985 | Japan | 264/132 |
| 818404 | 8/1959 | United Kingdom | 264/132 |

OTHER PUBLICATIONS

"Distortion Printing and Vacuum Forming of Thermoplastic Sheet", *SPE Journal*, pp. 741–745, Jul. 1962.

*Primary Examiner*—Robert Davis
*Attorney, Agent, or Firm*—Wenderoth, Lind & Ponack

[57] ABSTRACT

A method of enlarging a design possessed by a synthetic resin film includes a printing step of printing the design on the top side of the synthetic resin film, and an enlarging deformation step of providing a curved portion by stretching a prescribed surface of the synthetic resin film which includes a portion on which the design has been printed and curvingly deforming the prescribed surface in such a manner that the surface will protrude above the plane defined by the synthetic resin film. The design printed on the synthetic resin film beforehand in the printing step is printed in dimensions conforming to the rates of enlargement of points on the curved portion of the synthetic resin film. A portion of the design having a small rate of enlargement is printed at relatively large dimensions in comparison with other portions thereof and a portion of the design having a high rate of enlargement is printed at relatively small dimensions in comparison with other portions thereof.

5 Claims, 4 Drawing Sheets

Fig. 5(A)
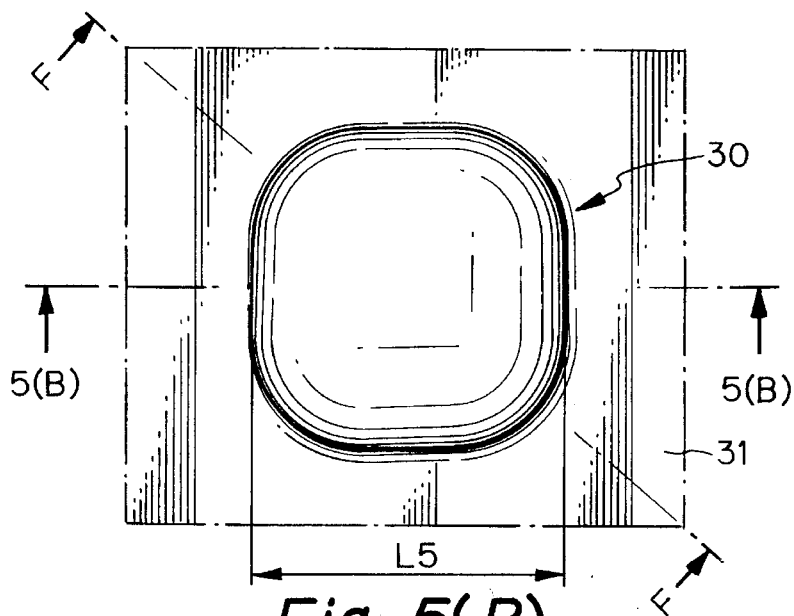
Fig. 5(B)
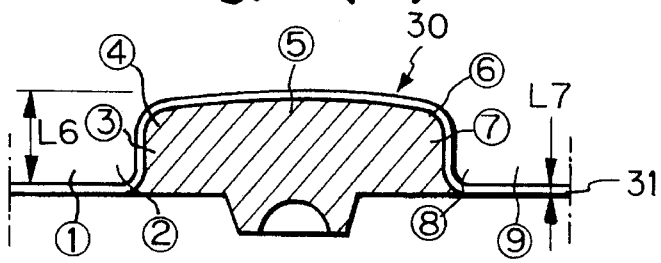
Fig. 6
| | CROSS SECTION 5(B)-5(B) | | CROSS SECTION F-F | |
|---|---|---|---|---|
| | THICKNESS (μm) | THICKNESS RETENTION RATE (%) | THICKNESS (μm) | THICKNESS RETENTION RATE (%) |
| ① | 80 | 100 | 74 | 100 |
| ② | 65 | 81 | 71 | 96 |
| ③ | 65 | 81 | 59 | 80 |
| ④ | 46 | 58 | 41 | 55 |
| ⑤ | 40 | 50 | 40 | 54 |
| ⑥ | 47 | 59 | 42 | 47 |
| ⑦ | 66 | 83 | 67 | 91 |
| ⑧ | 66 | 83 | 71 | 96 |
| ⑨ | 79 | 100 | 73 | 100 |

METHOD OF ENLARGING DESIGN PROVIDED ON A SYNTHETIC RESIN FILM

BACKGROUND OF THE INVENTION

1. Field of the Invention

This invention relates to a method of enlarging a design on a synthetic resin film having the design.

2. Description of the Related Art

A keytop 200 of the kind shown in FIGS. 7(A) and 7(B) has been developed as a keytop which is simple in structure and lends itself to a reduction in size and thickness [see the specification of Japanese Patent Application Laid-Open (KOKAI) NO. 6-44859]. The keytop 200 is formed by clamping a synthetic resin film 201 between upper and lower molds defining a cavity in the shape of a keytop, introducing a molten molding resin 211 under pressure from the side of the lower mold, thereby causing the synthetic resin film 201 to curvingly deform in the upward direction and form a curved portion 203 the shape of which is identical with that of the cavity in the upper mold, and simultaneously filling the recess on the lower side of the curved portion 203 with the molding resin 211.

The connection between the synthetic resin film 201 and the molding resin 211 is achieved by a bonding-agent layer 205, which is applied to the synthetic resin film 201 in advance by printing, before the molding resin 211 is introduced under pressure. By printing a desired design 207, which comprises a print layer, between the synthetic resin film 201 and the bonding-agent layer 205, the design 207 will appear on the top side of the keytop 200.

In the example of the prior art described above, the curved portion 203 of the synthetic resin film 201 is formed by stretching the synthetic resin film 201. Consequently, the design 207, which is printed before the stretching operation, is stretched as well. In other words, the originally printed design 207 is enlarged.

In the course of repeating a variety of experiments, the inventors have found that all points on the curved portion 203 of the synthetic resin film do not exhibit the same rate of enlargement. Rather, the rate of enlargement differs from point to point.

This means that however accurate the original design 207 printed on the synthetic resin film 201, the enlarged design 207 obtained after manufacture of the keytop 200 will exhibit some deformation.

If the keytop 200 is circular in shape, as in the illustrated example of the prior art, the deformation of the design 207 is not that great. However, if the keytop 200 is elliptical or rectangular in shape, the amount of deformation is larger.

When the keytop 200 is manufactured, the periphery of the region where the curved portion 203 of the synthetic resin film 201 is formed is clamped firmly by the upper and lower molds. However, the clamping force of the upper and lower molds along the outer circumference of the cavity in the upper mold differs depending upon the particular location owing to a disparity in the thickness of the synthetic resin film 201 or a variance in the degree of flatness and degree of smoothness of the upper and lower molds. As a consequence, there is the danger that the synthetic resin film situated at the outer circumferential portion of the cavity will be damaged when the synthetic resin film 201 is stretched and curved at deformation thereof. In addition, a weakly clamped portion of the synthetic resin film 201 is pulled into the curved portion 203 by a greater amount than a strongly clamped portion, as a result of which the synthetic resin film 201 is not deformed uniformly. Thus there is the danger that the deformation of the design 207 will take place with even less accuracy.

Furthermore, if the print layer is provided on the entire upper surface of the synthetic resin film 201 shown in FIGS. 7(A) and 7(B), damage to the synthetic resin film 201 does not occur by virtue of the elasticity and viscosity of the print layer. However, besides a variance in the print layer, a variance which depends upon the location of the synthetic resin film 201 pulled into the curved portion 203 occurs in the same manner and the design 207 undergoes deformation inaccurately. This is just as set forth above in the example of the prior art.

SUMMARY OF THE INVENTION

Accordingly, an object of the present invention is to provide a method of enlarging a design on a synthetic resin film having the design, in which it is so arranged that the entirety of the enlarged design after deformation of the synthetic resin film will take on the desired shape.

According to the present invention, the foregoing object is attained by providing a method of enlarging a design on a synthetic resin film having the design, the method comprising a printing step of printing a desired design on a top side or bottom side of a synthetic resin film exhibiting flexibility, and an enlarging deformation step of enlarging the design by stretching a prescribed surface of the synthetic resin which includes a portion on which the design has been printed and curvingly deforming the prescribed surface in such a manner that the surface will protrude above a plane defined by the synthetic resin film, characterized in that the design printed on the synthetic resin film at the printing step is printed in dependence upon rate of enlargement of each portion of the synthetic resin film stretched at the enlarging deformation step, with a portion of the design having a small rate of enlargement being printed at relatively large dimensions in comparison with other portions thereof and a portion of the design having a high rate of enlargement being printed at relatively small dimensions in comparison with other portions thereof, whereby the overall enlarged design after enlarging deformation takes on a desired shape.

The curvingly deformed portion of the synthetic resin film provided with the design is formed by stretching the synthetic resin film. The rate of enlargement of the curvingly deformed portion differs from point to point. According to the present invention, the design printed on the synthetic resin film at the printing step is printed in dependence upon the rate of enlargement of each portion of the synthetic resin film stretched at the enlarging deformation step. A portion of the design having a small rate of enlargement is printed at relatively large dimensions in comparison with other portions, and a portion of the design having a high rate of enlargement is printed at relatively small dimensions in comparison with other portions. As a result, the entirety of the enlarged design after deformation of the synthetic resin film is not deformed inaccurately and, hence, the desired shape can be obtained with ease.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1(A) through 1(C) illustrate keytops with design manufactured in accordance with the present invention, in which FIG. 1(A) is a plan view, FIG. 1(B) is a sectional view taken along line 1(B)—1(B) of FIG. 1(A) and FIG. 1(C) a sectional view taken along line 1(C)—1(C) of FIG. 1(A);

FIGS. 5(A) and 5(B) illustrate keytops, in which FIG. 5(A) is a plan view and FIG. 5(B) is a sectional view taken along line 5(B)—5(B) of FIG. 5(A);

FIG. 6 is a table showing results of measuring the thickness of a synthetic resin film at cross sections thereof along lines 5(B)—5(B) and F—F;

FIGS. 7(A) and 7(B) illustrate keytops according to the prior art, in which FIG. 7(A) is a plan view and FIG. 7(B) is a side section taken along line 7(B)—7(B) of FIG. 7(A)

DESCRIPTION OF THE PREFERRED EMBODIMENTS:

Preferred embodiments of the present invention will now be described in detail with reference to the accompanying drawings.

Figure 1A:
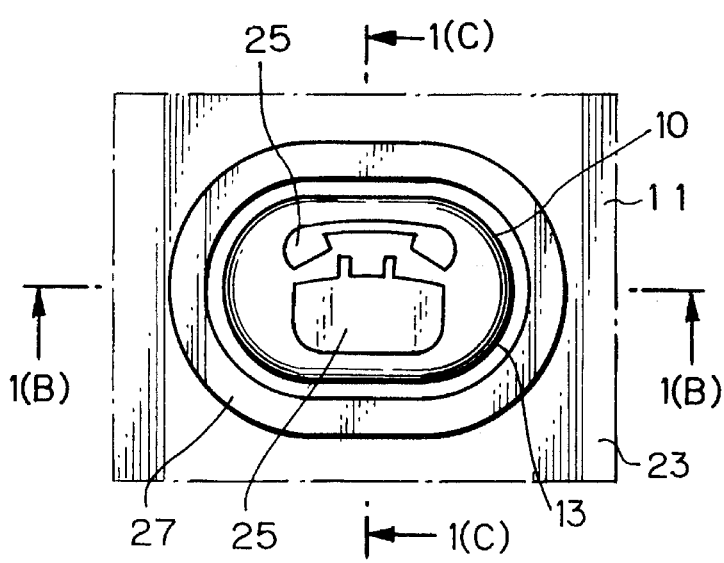
Figure 1C:
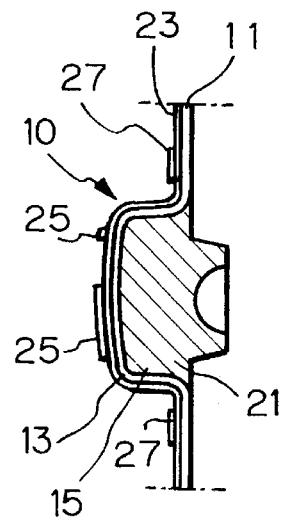
Figure 1B:
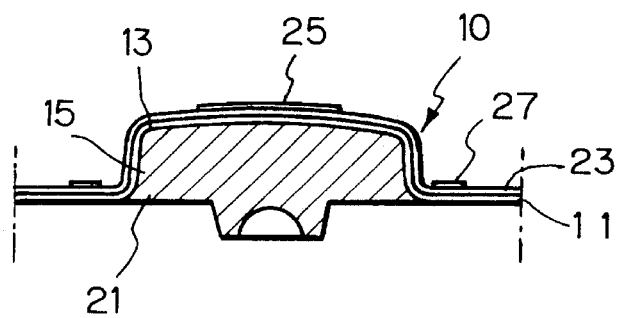

FIGS. 1(A) through 1(C) illustrate a keytop 10 with a design 25. The keytop 10 is manufactured using the inventive method of enlarging the design on a synthetic resin film. In FIGS. 1(A) through 1(C), FIG. 1(A) is a plan view, FIG. 1(B) is a sectional view taken along line 1(B)—1(B) of FIG. 1(A) and FIG. 1(C) is a sectional view taken along 1(C)—1(C) of FIG. 1(A).

As shown in FIGS. 1(A) through 1(C), the keytop 10 having the design 25 includes a flexible, thermoplastic synthetic resin film 11 consisting of, for example, polyethylene terephthalate, polyethylene naphthalate, etc. A prescribed portion of the film 11 is curved in the upward direction to form a curved portion 13. A concave portion formed on the underside of the curved portion 13 is filled with a molding resin 21 (such as polycarbonate resin or polymethyl methacrylate resin) in concurrence with the formation of the curved portion 13. The curved portion 13 and the molding resin 21 fuse together into a unitary body, thereby forming the keytop 10.

A print layer 23 of modified urethane resin for providing a display of a desired color is printed on the entire upper surface of the synthetic resin film 11. The design 25, which comprises a desired print layer of modified urethane resin, is printed on the print layer 23. A ring-shaped print layer 27 of modified urethane resin for being clamped by a mold is printed on the periphery of the curved portion 13. The print layer 27 may be a single layer (having a thickness of about 5 μm) or a plurality of layers. The inventors have conducted experiments using one to three layers (for a total thickness of about 15 μm in the case of three layers) and have determined that the effects of the invention, set forth below, are manifested in each case.

Figure 2:
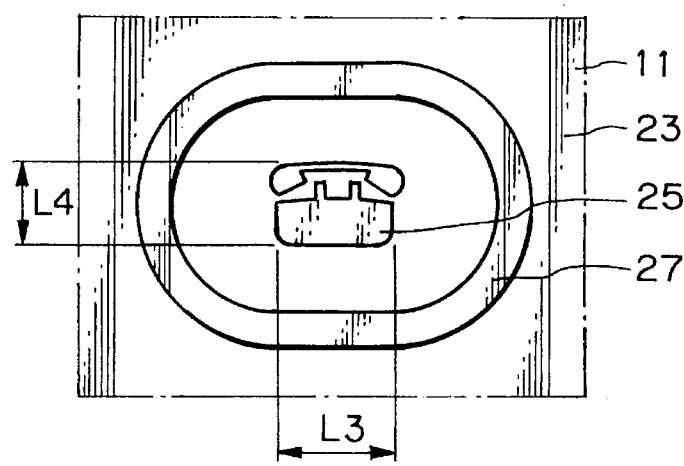
FIG. 2 is a plan view illustrating a design printed on the top side of a synthetic resin film.

In order to manufacture the keytop 10 having the design, first the print layer 23 for display purposes is printed on the entire upper surface of the synthetic resin film 11 and then the design 25 and print layer 27 for being clamped by the mold are printed on the print layer 23, as shown in FIG. 2.

These layers are formed in advance. In the present invention, special consideration is given to the dimensions and shape of the design 25, as will be described later.

Figure 3:
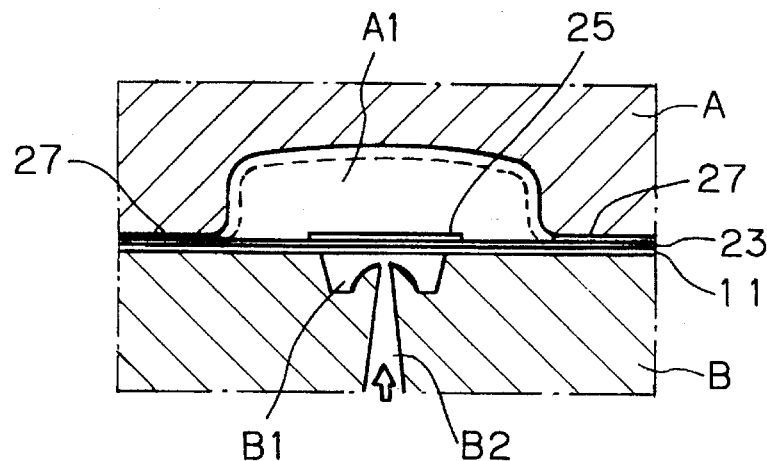
FIG. 3 is a schematic side section showing the synthetic resin film clamped by upper and lower molds.

Next, as shown in FIG. 3, the synthetic resin film 11 is clamped by upper and lower molds A, B. The upper mold A is formed to have a cavity A1 for molding the shape of the upper portion of the keytop 10, and the lower mold B is formed to have a cavity B1 for molding the shape of the lower portion of the keytop 10. A pin gate B2 is connected to the cavity B1.

When a high-temperature, high-pressure molten molding resin is introduced from the pin gate B2 under pressure, the molten molding resin fills the interior of the cavity B1 so that the portion of the synthetic resin film 11 situated at the cavity A1 is deformed by being urged upwardly while being stretched by heat and pressure. This portion of the synthetic resin film 11 comes into intimate adhering contact with the interior of the cavity A1, as indicated by the dashed line, and the molten molding resin fills the interior of the cavity A1 simultaneously. When the upper and lower molds A, B are separated and removed, this completes the manufacture of the keytop 10 shown in FIGS. 1(A) through 1(C).

The inventors have found through various experiments that if the high-temperature, high-pressure molten molding resin is made to contact the thermoplastic synthetic resin film while the film is being stretched under higher temperature and pressure, the synthetic resin film and the molding resin will fuse together strongly into a unitary body even if no bonding agent is used.

Accordingly, if, while the curved portion 13 is formed by stretching the synthetic resin film 11 under high temperature and pressure, the high-temperature, high-pressure molten molding resin is made to contact the synthetic resin film 11 simultaneously during stretching, as is done in the above-described embodiment, then the two will be fused together strongly without use of a bonding agent. It is permissible to mold the molding resin 21 upon printing a bonding-agent layer of modified urethane resin on the lower surface of the synthetic resin film 11 in advance. In such case the curved portion 13 of the synthetic resin film 11 and the molding resin 21 are bonded strongly together by the layer of bonding agent.

Though the part of the manufactured keytop 10 constituting the curved portion 13 is obtained by stretching the synthetic resin film 11, the rate of enlargement of the curved portion 13 differs from one point thereon to another.

Accordingly, the inventors have investigated the enlargement rate of each portion of the synthetic resin film 11 enlarged and deformed by being stretched and, in conformity with each enlargement rate, have determined the dimensions of each portion of the design 25 to be printed. More specifically, the inventors have determined the shape and dimensions of the design 25 in dependence upon the rate of enlargement. A portion of the design having a small rate of enlargement is given relatively large dimensions in comparison with other portions, and a portion of the design having a high rate of enlargement is given relatively small dimensions in comparison with other portions.

Methods which can be used to investigate the rate of enlargement at each point on the curved portion 13 will now be described by way of example.

[Method 1]

Arbitrary portions of the keytop 10 are cut along planes that are perpendicular to the plane of the synthetic resin film 11. When this is done, the lengths of the synthetic resin film 11 before and after enlarging deformation appear. The ratio between the length of the synthetic resin film before deformation and the length of the synthetic resin film after deformation is obtained and this ratio is adopted at the rate of enlargement (the rate of linear enlargement).

The rate of linear enlargement is expressed as follows:

[rate of linear enlargement] = [length after enlarging deformation]/[length before enlarging deformation]

In conformity with the rate of linear enlargement of each portion, the printing dimensions of the design 25 at a portion having a large linear rate of enlargement is made comparatively small and the printing dimensions of the design 25 at a portion having a small linear rate of enlargement is made comparatively large.

Figure 4A:
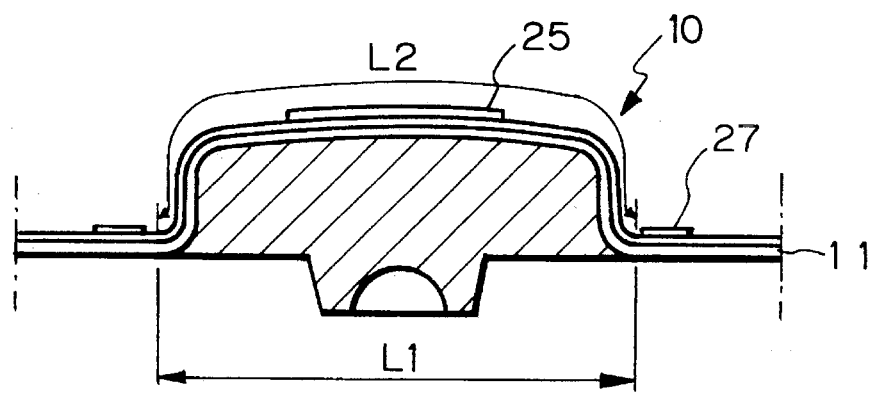
FIGS. 4(A) and 4(B) are diagrams showing a method of calculating rate of enlargement of the synthetic resin film.
Figure 4B:
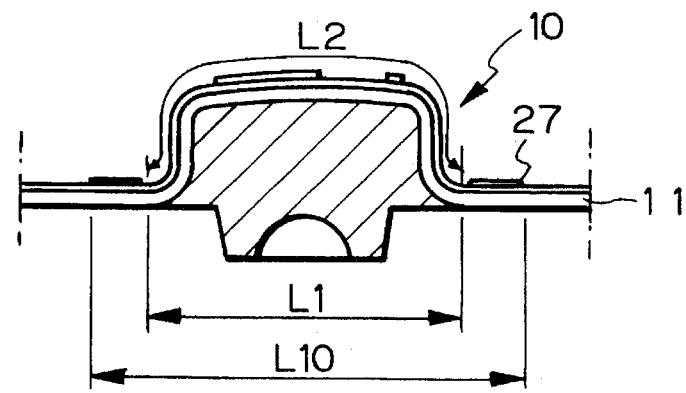
Figure 7A:
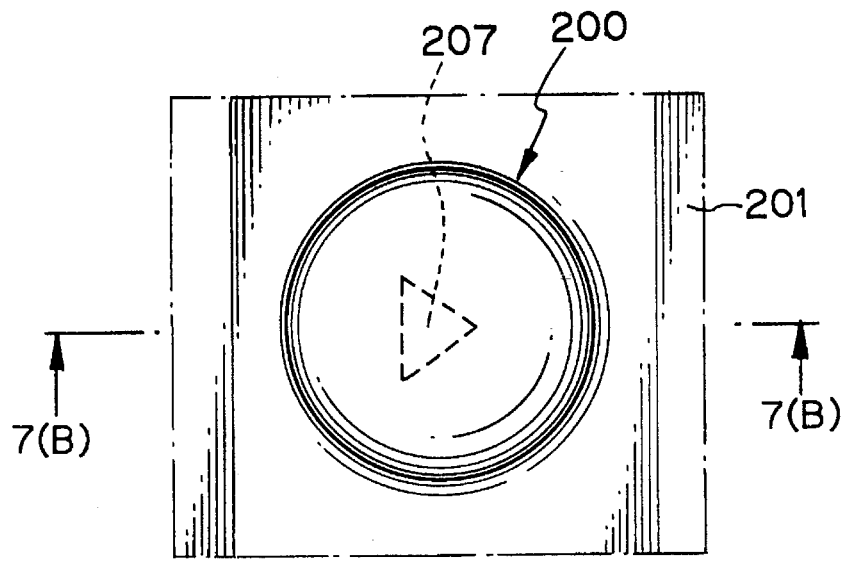
Figure 7B:
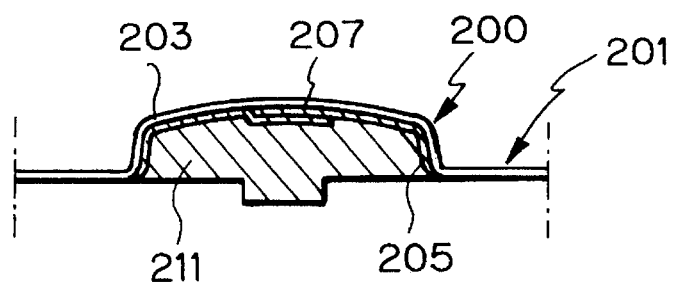

For example, lengths L1, L2 of the synthetic resin film 11 before and after deformation, respectively, at each of the cross sections 1(B)—1(B) and 1(C)—1(C) in the keytop 10 shown in FIGS. 1(A) through 1(C) were calculated as illustrated FIGS. 4(A) and 4(B).

As the result of calculation, L1 and L2 in the cross section 1(B)—1(B) were found to be as follows:

L1=11 mm, L2=15 mm and L1 and L2 in the cross section 1(C)—1(C) were found to be as follows:

L1=7 mm, L2=11 mm.

Accordingly, 1.36 was the linear rate of enlargement in the cross section 1(B)—1(B) and 1.57 in the cross section 1(C)—1(C).

As a result, a dimension L3 in the direction of the width of design 25 shown in FIG. 2 was made 1/1.36 in comparison with this dimension of the design 25 after deformation, and a dimension L4 in the height direction of the design 25 was made 1/1.57 in comparison with this dimension of the design 25 after deformation.

In this example, the linear rate of enlargement of the design 25 was calculated solely in longitudinal and transverse cross sections of the keytop 10. However, if linear rate of enlargement is calculated also in a diagonal direction or in any other direction as well, rate of enlargement of each portion of the design 25 can be determined with greater accuracy.

[Method 2]

According to the first method, linear rate of enlargement at each portion of the design 25 can be obtained diagrammatically and therefore calculation is easy.

However, it has been found by a variety of experiments that linear rate of enlargement obtained by the above-described calculation is not necessarily accurate. Specifically, it has been determined that when the synthetic resin film 11 is deformed to manufacture the keytop 10, the rate of elongation of the synthetic resin film 11 differs at various points in the same cross section. Accordingly, together with the first method, a second method described below also is effective in obtaining the rate of enlargement at each point.

Specifically, the second method involves measuring the thickness of the synthetic resin film at each portion when the keytop is actually molded. A portion having a comparatively large thickness exhibits a small rate of enlargement while a portion of comparatively small thickness exhibits a large rate of enlargement. A specific example is given below.

FIGS. 5(A) and 5(B) illustrate a keytop 30 of a shape different from that of the keytop 10 shown in FIGS. 1(A) through 1(C). In FIGS. 5(A) and 5(B), FIG. 5(A) is a plan view and FIG. 5(B) is a sectional view taken along line 5(B)—5(B) of FIG. 5(A).

The keytop 30 is molded into a generally square shape and has a width L5 of 6 mm and a height L6 of 1.6 mm. A synthetic resin film 31 has a thickness L7 of approximately 75 μm. The keytop 30 is manufactured by the method depicted in FIG. 3.

The thickness of the synthetic resin film 31 in cross sections 5(B)—5(B) and F—F of the keytop 30 were measured at each of nine points 1–9 shown in FIG. 5(B). The results of measurement are illustrated in FIG. 6.

As shown in FIG. 6, the thickness of the synthetic resin film 31 is different at each point in the same cross section. Portions of large thickness have a small rate of enlargement and portions of small thickness have a large rate of enlargement. In accordance with various experiments conducted by the inventors, it has been determined that when height L6 is less than half of width L5, the thickness of the synthetic resin film 31 at the top side (portions 4, 5, 6) is smaller than the thickness at the side walls (portions 3, 7). In this case, therefore, it will be appreciated that the design is enlarged at a rate of linear enlargement greater than that calculated according to the first method.

The rate of enlargement of the synthetic resin film 31 at each portion of the keytop 30 can be obtained accurately by measuring the thickness of the synthetic resin film 31 not only in the cross sections 5(B)—5(B), F—F but at other portions as well.

The reason for printing the ring-shaped print layer 27, which is clamped by the molds, about the periphery of the curved portion 13 in the keytop 10 shown in FIGS. 1(A) through 1(C) is as follows:

The print layer 27 for being clamped by the molds is printed on the synthetic resin film 11 to make the film 11 thicker than the portion thereof on the outer circumference. As a result, when the synthetic resin film 11 is clamped by the upper and lower molds A, B, as shown in FIG. 3, the portion provided with the print layer 27 is clamped in concentrated fashion. That is to say, this portion is clamped more strongly than the circumferential portion of the film outside it. Moreover, the print layer 27 for thus being clamped by the molds exhibits elasticity and viscosity. Accordingly, a specific portion of the film inside that on which the layer 27 is printed is not clamped especially strongly or weakly but uniformly. In addition, even if the synthetic resin film 11 is clamped strongly, it will not be damaged. A further advantage is that the print layer 27 has viscosity. Specifically, when the synthetic resin film 11 is stretched and curved, the part of the film 11 surrounding the curved portion 13 is pulled to some extent into the curved portion. However, owing to the viscosity of the film, the amount of each portion pulled in can be made uniform. As a result, any inaccuracy in the deformation of the design 25 ascribable to this phenomenon can be prevented.

Furthermore, in a case where a plurality of curved portions are formed in a single sheet of synthetic resin film simultaneously by a set of upper and lower molds, variance in the degree of flatness and degree of smoothness of each portion of the upper and lower molds is greater than when only one curved portion is formed, with the increase in variance corresponding to the increase in the overall area of the upper and lower molds. Accordingly, if the print layer 27 for being clamped by the upper and lower molds is not provided, as in the prior art, a disparity arises in the rate of enlargement between designs printed on the respective curved portions, and there is also a disparity in degree of deformation. This leads to irregularity or unevenness in the designs. By contrast, providing the print layer 27 makes it possible to uniformalize the amount of synthetic resin film pulled into each of the curved portions in a case where a plurality of curved portions are formed on the same sheet of synthetic resin film. The rate of enlargement of the designs can be made uniform at all curved portions and deformation does not take place inaccurately.

Figure 8:
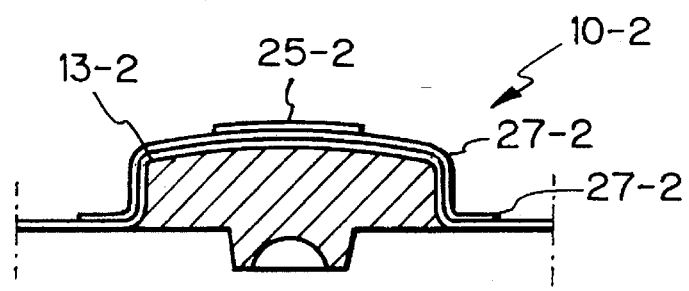
FIG. 8 is a side section illustrating another embodiment of the present invention.

The print layer for being clamped by the molds is not limited to the shape described above. For example, as shown in FIG. 8, a print layer 27-2 that has been printed on the top side of a curved portion 13-2 of keytop 10-2 may be extended a prescribed amount to reach the periphery of the curved portion 13-2. Thus, various modifications of the embodiment are possible. Numeral 25-2 in FIG. 8 denotes the design. Thus, so long as the print layer for being clamped by the molds is printed on the surface or underside of the synthetic resin film on the portion thereof surrounding the outer side of the portion deformed by enlargement, the print layer may have any shape whatsoever.

The print layer for being clamped by the molds is provided on the periphery of the curved portion. If this layer is printed up to a portion too remote from the curved portion, the effect of the layer is diminished. In the case of the keytop 10 according to the foregoing embodiment, as shown in FIG. 4(B), the short width L1 of the keytop 10 was made 6 mm and the width L10 of the clamped print layer 27 was made 8 mm. In this case the effects of the print layer 27 could be manifested fully. On the bases of experiments, it was confirmed that a case in which L1 and L10 were made 6 mm and 10 mm, respectively, in FIG. 4(B) also made it possible to manifest fully the effects of the print layer 27.

Various other methods of obtaining the rate of enlargement of each portion of a synthetic resin film are conceivable and any of these methods may be employed. What is essential is that the rate of enlargement of each point on the curved portion of the synthetic resin film be found and that the dimensions of each portion of a design to be printed be obtained in conformity with the rates of enlargement.

Further, in the embodiment described above, the method of enlarging the design on a synthetic resin film having the design involves enlarging and deforming the synthetic resin film by injecting a molten molding resin. However, this does not impose a limitation upon the invention. After the synthetic resin film is clamped by the upper and lower molds, the film can be made to deform into the shape of the cavity in the upper mold using another method.

More specifically, the synthetic resin film may be enlarged and deformed by vacuum molding or pneumatic molding in which the synthetic resin film is softened by heating and subjected to an external force (a vacuum or pressurized air) while still soft, the film is molded and then allowed to cool and harden. Another option is to enlarge and deform the film using a pressing method.

Further, the design may be printed on the underside of the synthetic resin film.

Thus, in accordance with the method of enlarging a design possessed by a synthetic resin film according to the present invention, the entire enlarged design after deformation of the synthetic resin film does not undergo deformation inaccurately and a design of the desired shape can be obtained with ease. In the case where the print layer for being clamped by the molds is printed, the amount by which the synthetic resin film about the periphery of this print layer is pulled into the curved portion can be made uniform, thereby preventing inaccurate deformation of the design. In a case where portions enlarged and deformed reside at a plurality of locations, the rates of enlargement of the respective designs can be made uniform.

As many apparently widely different embodiments of the present invention can be made without departing from the spirit and scope thereof, it is to be understood that the invention is not limited to the specific embodiments thereof except as defined in the appended claims.

What is claimed is:

1. A method of enlarging a design possessed by a synthetic resin film, comprising:

a printing step of printing a desired design on a top side or bottom side of a synthetic resin film exhibiting flexibility; and an enlarging deformation step of enlarging the design by stretching a prescribed surface of the synthetic resin film which includes a portion on which the design has been printed and curvingly deforming the prescribed surface in such a manner that the surface will protrude above a plane defined by the synthetic resin film;

the design printed on the synthetic resin film at said printing step being printed in dependence upon rate of enlargement of each portion of the synthetic resin film stretched at said enlarging deformation step, with a portion of the design having a small rate of enlargement being printed at relatively large dimensions in comparison with other portions thereof and a portion of the design having a high rate of enlargement being printed at relatively small dimensions in comparison with other portions thereof, whereby the overall enlarged design after enlarging deformation takes on a desired shape;

in said printing step, a print layer for being clamped by upper and lower molds being printed on a surface or underside of the synthetic resin film on at least a portion thereof surrounding the portion deformed by enlargement;

said enlarging deformation step being performed by urging the synthetic resin film upward into intimate adhering contact with an inner surface of a cavity in the upper mold in a state in which the synthetic resin film is clamped between the upper mold and lower mold each of which has a cavity; and separating the upper and lower molds.

2. A method of enlarging a design possessed by a synthetic resin film, comprising:

a printing step of printing a desired design on a top side or bottom side of a synthetic resin film exhibiting flexibility;

clamping the synthetic resin film between an upper mold and a lower mold each of which has a cavity so that a printed portion of the synthetic resin film is positionable in the cavity of the upper mold;

an enlarging deformation step of enlarging the design by injecting a molten molding resin from the side of the lower mold, whereby an overall surface of the portion of the synthetic resin film positionable in the cavity of the upper mold is enlarged by urging the molten molding resin upward to urge said portion of the synthetic resin film into intimate adhering contact with an inner surface of the cavity of the upper mold by heat and pressure of the molten molding resin, and whereby a space under the deformed synthetic resin film which has been deforming identical with the shape of the cavity of the upper mold is filled with the molten molding resin;

the design printed on the synthetic resin film at said printing step being printed in dependence upon rate of enlargement of each portion of the synthetic resin film stretched at said enlarging deformation step, with a portion of the design having a small rate of enlargement being printed at relatively large dimensions in comparison with other portions thereof and a portion of the design having a high rate of enlargement being printed at relatively small dimensions in comparison with other portions thereof, whereby the overall enlarged design after enlarging deformation takes on a desired shape; and separating the upper and lower molds after the molten molding resin is cured.

3. The method according to claim 2, wherein in said printing step, a print layer for being clamped by the upper and lower molds is printed, besides the design, on a surface or underside of the synthetic resin film on at least a portion thereof surrounding the portion deformed by enlargement.

4. The method according to claim 2, wherein the underside of the synthetic resin film being stretched at the enlarging deformation step is directly fused to the molding resin.

5. The method according to claim 2, wherein a layer of bonding agent is previously formed on a surface on the underside of the synthetic resin film which is positionable in the cavity of the upper mold, and wherein in the enlarging deformation step the underside of the synthetic resin film being stretched is bonded to the molding resin by the layer of bonding agent.

\* \* \* \* \*